Patented July 14, 1953

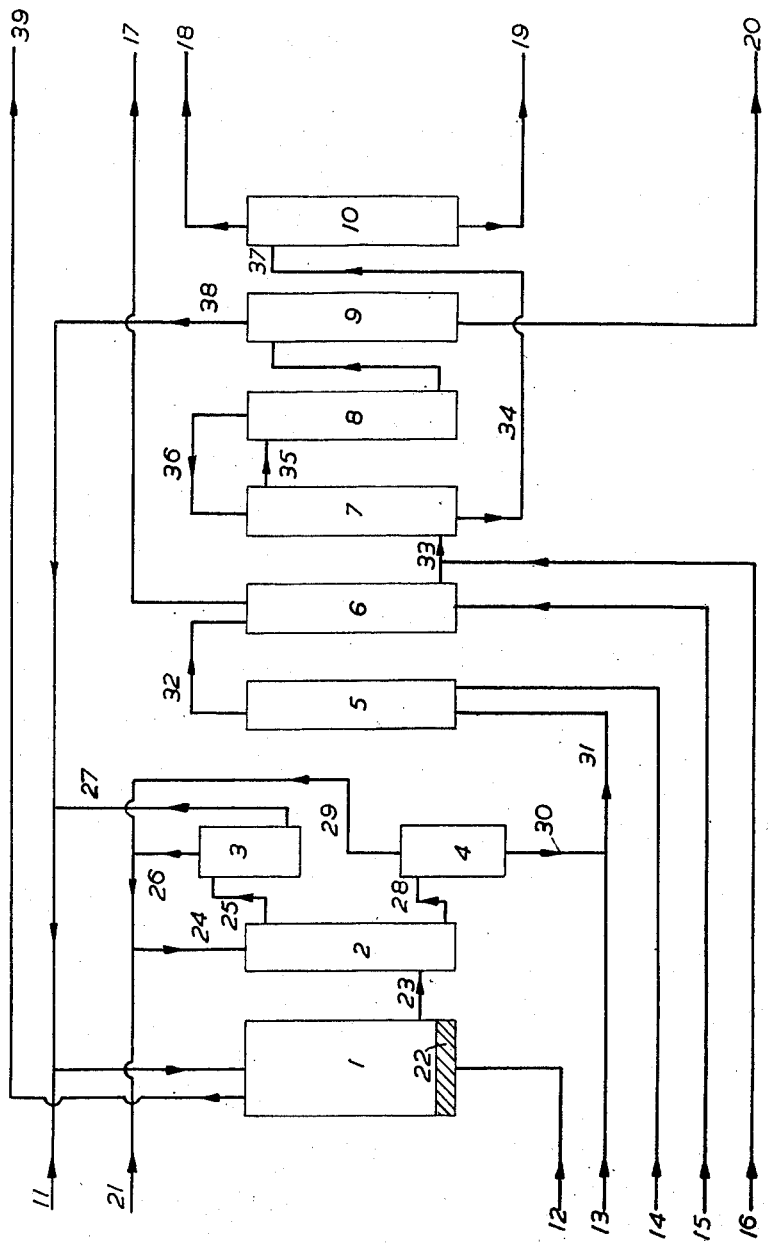

2,645,656

UNITED STATES PATENT OFFICE 2,645,656

PRODUCTION OF SURFACE ACTIVE SULFATES

Wilfred John Oldham and Max Marin Wirth, Sunbury-on-Thames, England, assignors to Anglo-Iranian Oil Company, Limited, London, England, a British joint-stock corporation Application July 13, 1950, Serial No. 173,658
In Great Britain July 19, 1949

40 Claims. (Cl. 260—457)

This invention relates to the production of surface active agents.

Metal alkyl sulphates for use as surface active agents are conventionally produced by treatment of olefines or olefine containing hydrocarbon mixtures with sulphuric acid. Olefine-containing materials which have been found suitable are distillation fractions of shale oil and of the product of the cracking of petroleum wax.

It is an object of the present invention to provide a new process for the production of surface active agents. More particularly, it is an object to provide a process for the production of surface active agents of the metal alkyl sulphate type using a paraffinic or naphthenic hydrocarbon feedstock.

According to the invention, surface active agents are produced by reacting long chain alkyl hydroperoxides with sulphur dioxide under conditions under which alkyl hydrogen sulphates are produced and converting the said alkyl hydrogen sulphates to alkyl sulphate salts or esters of metals, ammonia, organic bases or other bases.

According to a modification of this process alkyl substituted naphthene hydroperoxides are employed in place of or in admixture with the said long chain alkyl hydroperoxides.

The nature of the surface active agent produced will be dependent, in part, upon the nature of the alkyl or alkyl naphthene group contained in the hydroperoxide. In general this group remains unchanged during treatment with sulphur dioxide and it is thus possible to select an alkyl or alkyl naphthene hydroperoxide to give a surface active agent of required characteristics in accordance with the known variations of properties of alkyl metal sulphates with carbon chain structure. Thus in general, alkyl hydroperoxides of 10–20 carbon atoms per molecule or alkyl naphthenes having 4–16 carbon atoms in the side chain have been found satisfactory. Surface active agents for use primarily as detergents are preferably produced from alkyl hydroperoxides containing a straight carbon chain of 12–16 carbon atoms.

The reaction of sulphur dioxide with the long chain hydroperoxides may be carried out at any temperature above the freezing point of sulphur dioxide but a reaction temperature of at least −10° to −5° C. is preferred. Although temperatures up to 100° C. or higher may be employed, at the higher temperatures a considerable fall in yield of alkyl hydrogen sulphate is experienced and temperatures below 50–60° C. and particularly at or below atmospheric (that is in the range 0°–30° C.) are preferred.

Sulphur dioxide may be employed in the gaseous or liquid phase, at elevated, normal or reduced pressure.

The sulphur dioxide may be reacted with the long-chain hydroperoxide alone or with the hydroperoxide in the presence of a diluent such as an organic solvent inert to sulphur dioxide, for example, saturated hydrocarbons, alcohols and glycols. Alternatively the hydroperoxide may be dispersed in an aqueous medium, or in an aqueous alkali medium as hereinafter described.

Preferably the reaction mixture is agitated continuously.

Suitable bases for use in neutralising the alkyl or alkyl-naphthene hydrogen sulphates include the oxides, hydroxides, and carbonates of potassium, sodium, lithium, calcium, barium, strontium and magnesium, also ammonia, hydroxylamine, hydrazine, cyclic nitrogen compounds such as pyridine, piperidine, quinoline, amines and alkanolamines such as triethanolamine.

Alkyl hydroperoxides and alkyl-naphthene hydroperoxides are readily produced by the liquid phase oxidation of hydrocarbons by molecular oxygen or by other methods known in the art.

According to a further feature of the present invention, surface active agents are produced from paraffins and naphthenes by a process which comprises treating long chain paraffins and/or alkyl naphthenes, preferably long chain alkyl naphthenes, with molecular oxygen or gaseous mixtures comprising molecular oxygen to form alkyl and/or alkyl naphthene hydroperoxides and thereafter treating the product, or a refined product containing the said hydroperoxides, with sulphur dioxide to form alkyl hydrogen sulphates and/or alkyl naphthene hydrogen sulphates and converting the said sulphates to salts of metals, ammonia, organic bases or other bases.

Suitable paraffins for oxidation to alkyl hydroperoxides for use according to the invention include, n-decane its branched chain isomers and homologues in which the number of carbon atoms per molecule preferably does not exceed 20.

Suitable naphthenes include mono-, di- or poly-alkyl substituted cyclobutane, cyclopentane, cyclohexane, cycloheptane, wherein the alkyl groups are, for example, methyl, ethyl, propyl, isopropyl, butyl, isobutyl, tert-butyl, or higher alkyl groups.

Preferably the paraffins and/or naphthenes are treated with oxygen to effect only a low conversion to oxygenated products. Thus, in general, the total proportion of paraffin and naphthene oxidised is less than 25% by weight and preferably 5–20% by weight.

The oxidation may be aided by the addition of a catalyst. A small proportion of organic peroxide, e. g. tertiary butyl hydroperoxide, is preferably added to the oxidation feedstock to initiate the reaction. If desired, a small proportion of the oxidation product may be employed to initiate the reaction of subsequent batches of the oxidation feedstock. Alternatively the reaction may be carried out in continuous manner.

If desired the oxidate may be treated for the concentration of the hydroperoxides before sulphur dioxide treatment. According to one method of concentration the oxidate is subjected to distillation, usually at reduced pressure, for the removal of at least part of the unreacted hydrocarbon. This method is preferably applied only to relatively volatile feedstocks, for example, having less than 12 carbon atoms/molecule, since with less volatile feedstocks appreciable decomposition of the hydroperoxides may occur, owing to the higher distillation temperatures required.

According to another method of concentration, the oxidate is extracted with a polar solvent, such as for example, methanol, ethanol or higher alcohols, glycols, or "Cellosolve" and the hydroperoxide concentrate recovered from the extract by distilling off the solvent, preferably at reduced pressure. Alternatively the extract may be diluted with an aqueous medium to throw the hydroperoxide out of solution.

If desired the hydroperoxides may be reacted with sulphur dioxide without prior separation of solvent from the extract.

In addition to these physical methods it is possible to concentrate the peroxides chemically. If the crude oxidate is treated with alkali until it is neutral to phenolphthalein, carboxylic acids and only minor amounts of peroxide are extracted into the aqueous layer. Using a large excess of alkali on the oxidate either before or after such removal of carboxylic acids the hydroperoxides may be extracted and recovered as a concentrate by subsequent acidification of the aqueous alkali extract, the efficiency of the process being dependent on the nature of the peroxides present.

Unoxidised hydrocarbons, recovered in the concentration of hydroperoxide, may be recycled to the oxidation stage.

The reaction of the hydroperoxides with sulphur dioxide may be carried out using the whole of the oxidation product. If preferred the oxidation product may be treated with aqueous alkali, e. g. caustic soda or alkali carbonates in sufficient quantity and strength to remove the organic acids contained therein before reaction with sulphur dioxide. Alternatively, the organic acids may be retained to form a constituent of the final product.

Suitable oxidation feedstocks are refined kerosine fractions, hydrogenated oils from the Fischer-Tropsch synthesis and petroleum waxes. Olefine containing materials such as wax cracking product fractions, shale oil fractions or crude hydrocarbon synthesis fractions may first be treated for the removal of olefines, for example, by conversion of the olefines to alkyl sulphates with sulphuric acid and the residue if necessary treated for the removal of sulphur and thereafter subjected to oxidation and treatment with sulphur dioxide in accordance with the present invention.

In general, the presence of sulphur compounds and aromatic compounds in the oxidation feedstock are undesirable and if present in the mixture to be processed are preferably removed, for example by acid treatment, distillation or solvent extraction, before the oxidation stage.

According to one method of carrying the invention into practice, sulphur dioxide is passed into an agitated mixture of the hydroperoxide-containing oil and water. When no further amounts of sulphur dioxide react, as indicated by the falling heat evolution, the aqueous phase, containing alkyl and/or cyclo-alkyl hydrogen sulphates, is separated. The oil phase is washed with water and the total aqueous phase and extracts boiled to remove sulphur dioxide and then treated with a metallic base, ammonia, an organic base or other base to form the alkyl sulphate salt or ester.

The oil layer, after washing with caustic alkali to remove organic acid if not previously removed, is preferably distilled to separate high boiling residues and may then be recycled to the oxidation stage.

According to an alternative method, the crude oxidation product is treated with sulphur dioxide. When no further amounts of sulphur dioxide are absorbed, excess sulphur dioxide is removed, for example by blowing with an inert gas. Water is then added and the whole product neutralised with a metal base or ammonia. The aqueous layer is separated and the oil layer washed with water. The combined aqueous layer and extracts are then washed with light petroleum to remove oil and other impurities. The remaining aqueous solution may be evaporated to dryness under conventional conditions. Operating in this manner, carboxylic acid salts are carried through into the product.

The residual oil may be recycled to the oxidation stage.

When a crude oxidate obtained from a mineral oil fraction is reacted with sulphur dioxide without prior treatment for the concentration of hydroperoxides, the residual oil obtained after sulphur dioxide treatment is not always suitable for recycle to the oxidation stage unless it is first subjected to a refining treatment. Preferably the residual oil is washed with sulphuric acid, most preferably concentrated sulphuric acid, or distilled for the separation of high boiling residues or solvent extracted with a polar solvent such as methanol and the refined material recycled to the oxidation stage.

When the crude oxidate is subjected to treatment, for the concentration of the hydroperoxides, before reaction with sulphur dioxide, for example by distillation or solvent extraction as hereinbefore described, the residual oil obtained after removal of the hydroperoxides is usually suitable for recycle to the oxidation stage without further treatment.

According to a further modification of the process of the invention a mixture or solution comprising a long chain alkyl hydroperoxide, an alkali-metal hydroxide and an aqueous or alcoholic medium are treated with sulphur dioxide to form an alkali metal alkyl sulphate, under the conditions described for the production of alkyl hydrogen sulphates.

If desired an aqueous alkali metal hydroxide solution of the alkali metal salts of the hydroperoxides may be obtained by extraction of a crude oxidate with aqueous alkali metal hydroxide solution as hereinbefore described.

The process of the invention is illustrated but in no way limited by the figure accompanying the complete specification. The figure is a flow diagram relating to the conversion of hydrocarbons to alkyl sulphate salts in aqueous solution.

Fresh hydrocarbon is fed through line 11 into the oxidiser 1 which is kept at the desired temperature for example 140° C. Air or oxygen is supplied to the acidiser from line 12 and is dispersed by a suitable filter 22. The reactor 1 is advantageously constructed of a suitable material resistant to corrosion by organic acids, for example of glass or having glass or enamel lining, or stainless steel. This is important since many metal salts of organic acids catalyse the decomposition of organic peroxides. Exhaust gases are led off through 39 and volatile products may be recovered therefrom if desired. The oxidised hydrocarbon is taken off continuously through line 23 and oxygenated compounds are extracted therefrom with a suitable solvent such as methanol in a counter-current extractor 2. The raffinate is led through 25 into a still 3 wherein the solvent is stripped off and recycled through line 26 to the counter-current extractor 2. The stripped raffinate is recycled to the oxidation stage through 27. The extract from 2 is led through line 28 into a still 4 wherein the solvent is distilled and recycled to the counter-current extractor 2 through line 29. Any solvent lost in the operation is replaced by fresh solvent through line 21. The hydroperoxide concentrate leaves still 4 through line 30 and is mixed with water supplied by line 13 and fed through line 31, into a reactor 5 in which the temperature is controlled at the required level. Simultaneously sulphur dioxide is introduced from line 14 into the reactor 5 where it combines with the hydroperoxides in the presence of water. The resulting emulsion is led through line 32 into an aerator 6 in which it is stripped of excess sulphur dioxide by a stream of inert gas such as air supplied through line 15. Excess sulphur dioxide may be recovered from the effluent gas stream through line 17 and recycled to line 14 if desired. The aqueous emulsion leaves 6 through line 33 and is neutralised with aqueous alkali supplied through line 16. The neutral emulsion is then extracted with a suitable solvent such as ether or light petroleum in a countercurrent extractor 7 to free the product of unreacted oil. The solvent extract is fed through 35 into a still 8 in which the solvent is recovered and recycled through 36 to the countercurrent extractor 7. The unreacted oil residue is led from still 8 by line 37 into still 9 in which it is distilled to yield unreacted hydrocarbons which are recycled to the oxidation stage through line 38 and a mixture of oxygenated compounds which leave still 9 through line 20. The aqueous phase from the countercurrent extractor 7 is led through line 34 into an evaporator 10 from which exhaust steam leaves through line 18 and a concentrated solution of the salt of the alkyl-sulphate leaves through line 19.

The invention is illustrated with reference to the following examples.

*Example 1*

An aromatic free kerosine fraction of boiling range 220–230° C. was oxidised with air at 130° C., a little tertiary butyl hydroperoxide being added to initiate oxidation. The acids in the oxidation product were extracted with a quantity of 5% aqueous caustic soda equivalent to the acid value of the oxidate, followed by water, leaving a final oil product containing 8% of peroxides (assuming a molecular weight of 200). 268 parts by weight of this material were treated with sulphur dioxide at −5° C. to 0° C., the reaction being practically completed in about 10 minutes. Sulphur dioxide remaining was displaced by a stream of nitrogen. 100 parts of water were added and the mixture made neutral to litmus by adding caustic soda. The aqueous layer was separated and the oil layer extracted with 50 parts of water. The aqueous extract and the aqueous layer were combined and extracted with 35 parts by weight of petroleum ether. The orange coloured aqueous solution was evaporated and the solid product dried in vacuo at 90° C. for 6 hours, yielding 16 g. of a brownish paste which contained the alkyl sulphate active agent.

*Example 2*

This illustrates the use of a crude oxidation product in the sulphur dioxide reaction. 200 parts by weight of aromatic free kerosine (boiling range 220–230° C.) were heated to 130° C. 0.5 part by weight of tertiary butyl hydroperoxide were added to initiate the oxidation, and air was blown through at a rate of 300 l./hour/kg. of kerosine until the oxidation product contained 9.1% of peroxide, and had an acid value of 7.7 mg. KOH/g. This crude oxidation product was reacted with sulphur dioxide at −5° C. From 200 parts by weight of oxidate, treating the product as in Example 1, 20.5 parts by weight of dry sodium salts was obtained. Distillation of the residual oil gave 144 parts by weight of distillate oil which was recycled to the oxidation.

*Example 3*

This illustrates the reaction of sulphur dioxide with the hydroperoxide in oil solution in aqueous emulsion.

Equal volumes of kerosine oxidate prepared as in Example 1 and water were treated with a stream of sulphur dioxide with stirring. The temperature, initially 20° C., rose to 40° C. When reaction was complete the emulsion was separated and the clean aqueous layer boiled for 1 minute to displace excess sulphur dioxide. The resulting clean colourless solution was neutralised with aqueous caustic soda and evaporated to dryness. A practically white solid product was obtained, with a faint agreeable odour and an active agent content of 39% by weight.

*Example 4*

100 g. of crude product from the oxidation of tetradecane with air, the product containing 7.1% by weight of tetradecane hydroperoxide and having an acid value of 11.7 mg. KOH/g., was cooled and stirred. Gaseous $SO_2$ was bubbled through, keeping the temperature between 6–10° C. by regulating the rate of addition of sulphur dioxide and by the use of external cooling. When reaction had ceased, excess of $SO_2$ was removed by blowing with nitrogen for 15 minutes and the product was allowed to warm up to room temperature. 50 ccs. of water were added, followed by sufficient 10% aqueous caustic soda to neutralise acids present. The layers were separated, and the upper layer washed three times with 20 cc. water. The water washings and aqueous layer were combined and washed with petrol ether, breaking the emulsion formed with methanol. The washed aqueous layer was evaporated and dried, yielding 10.5 g. of a pale buff coloured product. The petrol ether was distilled from the combined oil layer and petrol ether washings, yielding 92 g. of residual oil containing 0.4% of peroxide and having an acid value of 2.

The active agent content of the solid dried product was 52 per cent w./w., the major part of which (95 per cent) reacted as tetradecyl sodium sulphate. The remainder of the solid product consisted mainly of sodium carboxylic acid salts derived from the acids present in the original crude oxidate, together with a minor proportion of inorganic salts.

*Example 5*

90 parts by weight of crude oxidate from the air oxidation of tetradecane, the oxidate containing 7% by weight of tetradecane hydroperoxide and having an acid value of 11.7 mg. KOH/g. was mixed with an equal weight of water, cooled and stirred. Gaseous $SO_2$ was bubbled through, keeping the temperature between 6° and 10° C. by external cooling and regulation of the rate of addition of $SO_2$. When reaction had ceased the hydrocarbon and aqueous phases were separated. The hydrocarbon phase was washed with water (50 parts by weight) twice and the washings bulked with the aqueous phase. This combined aqueous phase was heated to remove excess $SO_2$ and made just alkaline with 10% aqueous caustic soda. The resulting solution was extracted with petroleum ether, emulsions formed being broken with absolute methanol. The extracts were bulked with the original hydrocarbon phase and washed with a small proportion of 5% aqueous caustic soda, followed by water, these washings being added to the aqueous product. The combined solution was made neutral to litmus with dilute hydrochloric acid and evaporated to dryness, yielding 12.4 parts by weight of a buff coloured solid product. This had an active agent content of 33.6% w./w., about 90% of this reacting as tetradecyl sodium sulphate. The remainder of the solid was mainly sodium carboxylic acid salts derived from acids present in the crude oxidate together with a small quantity of inorganic salts.

Petroleum ether was distilled from the residual washed hydrocarbon product, leaving 85 parts by weight of hydrocarbon with a peroxide content of 0.3% w./w. and an acid value of 0.3 mg. KOH/g.

*Example 6*

200 grams of kerosene oxidate containing 6.1% w./w. hydroperoxide content and acid value 3.2 mg. KOH/g. was cooled to 0° C. and 36.9 ml. aqueous sodium hydroxide (1.972 N) was added with stirring. This quantity of alkali was calculated to be that required to neutralise the free carboxylic acids present in the oxidate together with the alkyl sulphates which could theoretically be formed from the hydroperoxide present. Sulphur dioxide in gaseous form was admitted below the liquid surface whilst stirring the reaction mixture, the temperature rising finally to 15° C. after 5 minutes' passage of the gas. Air was blown through the reaction mixture for 10 minutes to remove excess sulphur dioxide. It was found, however, that the reaction mixture still had an acid reaction and a further 22.5 ml. of sodium hydroxide (1.972 N) was added to achieve neutralisation to phenolphthalein.

The neutral aqueous layer was separated and evaporated to dryness yielding a light coloured solid weighing 14.84 grams and containing 29.1% w./w. active agent calculated as $C_{12}H_{25}SO_4Na$. The residual hydrocarbon layer was washed with a further 30 ml. of water. This aqueous layer gave .16 gram of solid on evaporation to dryness, thus indicating that the major proportion of the active agent is removed in the original aqueous phase.

*Example 7*

200 grams of kerosene oxidate containing 5.5% w./w. hydroperoxide acid value 1.83 mg. KOH/g. was heated in a flask to 95° C. with stirring and sulphur dioxide gas was admitted beneath the liquid surface. The mixture immediately turned brown and the temperature rose to 112° C. The gas was then admitted intermittently in order to prevent further rise in temperature. When excess sulphur dioxide was present its addition was stopped and air was blown through to remove the excess. Water (100 ml.) was then added, the temperature falling to 80° C. and the mixture was neutralised to phenolphthalein with 2 N caustic soda. The phases were then separated, the hydrocarbon phase being washed three times with 50 ml. of water. These washes were bulked with the main aqueous phase and the whole was washed three times with 50 mls. of 60–80° C. petroleum ether. The aqueous layer was then evaporated to dryness and gave a black-brown powder, weighing 5 g. and containing 13% w./w. active agent (calculated as $C_{12}H_{25}SO_4Na$). It is thus evident that whereas active agent is still produced when the reaction is carried out at about 100° C., the quality of the product in this case is inferior to that obtained when lower temperatures are used (e. g. 0–20° C.).

The hydrocarbon phase recovered from the reaction was washed once with 50% v./v. absolute methanol and the washed hydrocarbon was found to be suitable for reoxidation to hydroperoxides.

*Example 8*

A kerosine cut (B. P. 210–220° C.) was oxidised with air at 140° to yield 500 g. of an oxidate containing 5.5% hydroperoxides (calc. as M. W. 200). Extraction with an equal volume of absolute methanol afforded 566 g. of a 4.5% solution of hydroperoxides in methanol. The remaining hydrocarbon phase, containing some methanol, weighed 434 g. and contained 1.2% by wt. of hydroperoxides. This was recycled to the oxidation step without further purification.

178 grams of the hydroperoxide containing extract was treated with gaseous sulphur dioxide without cooling. The temperature rose from 20° to 40° C. Excess sulphur dioxide was expelled by aerating for 0.5 hour. The methanol solution was neutralised with aqueous 2 N NaOH to phenolphthalein and the resulting emulsion evaporated in vacuo solvent and water being recovered as distillate. 50 cc. of water were added to the residue and 13.5 grams of oil were then separated. Evaporation of the aqueous layer yielded 5.8 grams of product containing 42.2% by wt. of active agent.

*Example 9*

A methanol solution containing kerosine hydroperoxides was prepared as in Example 8. Evaporation of the solvent yielded a concentrate containing 33.2% hydroperoxides 18.05 g. of this concentrate were treated with sulphur dioxide with agitation and external cooling at 10–20° C.

Excess sulphur dioxide was blown off with air for 10 minutes during which time a viscous orange oil separated. The whole reaction product was neutralised with 2 N NaOH whereupon the product separated quite readily into two layers. The upper oily layer weighed 12.3 grams. On evaporation the aqueous layer yielded 5.0 grams of product containing 39.6% active agent.

*Example 10*

17 grams of a 33.2% kerosine hydroperoxide concentrate obtained as in Example 9 were dispersed in 100 cc. of water. Sulphur dioxide was bubbled into the dispersion with vigorous stirring at 20–30° C. The product was neutralised with aqueous alkali and after separating 12 grams of supernatant oil evaporation of the aqueous layer afforded 6.5 grams of a product containing 35.6% by wt. active agent.

*Example 11*

16.5 grams of the same concentrate as in Example 9 were dispersed in 100 cc. of water containing 44 millimoles of NaOH. Treatment with sulphur dioxide yielded 12 grams of neutral oil and an aqueous solution of 6.6 grams of a solid containing 32.7% by wt. active agent.

*Example 12*

An aqueous solution of hydrogen alkyl sulphate was prepared as in Example 10 from 35 mol. of hydroperoxides. The oil layer was separated before neutralisation and contained most of the carboxylic acids present in the original hydroperoxide concentrate. It did not contain any appreciable quantity of hydrogen alkyl sulphate. The aqueous solution of hydrogen alkyl sulphate was treated with powdered magnesium carbonate. This was added under stirring until no more went into solution and the product was neutral to litmus. Concentration yielded 7.8 grams of a pale coloured solid containing 30% by weight of active agent.

*Examples 13*

Instead of using magnesium carbonate an aqeous solution of hydrogen alkyl sulphate prepared as in Example 12 was treated with a slight excess of aqueous ammonia. Evaporation yielded 8.1 grams of a reddish brown product containing 35% by weight of active agent.

*Example 14*

Hydrogen alkyl sulphate was prepared from 24.6 grams of a 30.3% kerosine hydroperoxide concentrate. Without separating the oily layer, the whole product was treated with a slight excess of pyridine. The oily layer (15 grams) was then separated, and contained more than 30% of the carboxylic acids originally present in the hydroperoxide concentrate but no appreciable quantity of active agent. Evaporation of the aqueous layer yielded 11.7 grams of a viscous orange oil having a pleasant odour and containing 37% of active agent.

*Example 15*

An aqueous solution of hydrogen alkyl sulphate was prepared as in Example 12 but instead of using magnesium carbonate, the product was neutralised to litmus with an approximately 50% aqueous solution of triethanolamine. Evaporation yielded 14.3 grams of a viscous orange oil containing 29% by weight of active agent.

We claim:

1. A process for the production of a surface active agent which comprises reacting a long chain alkyl hydroperoxide with sulphur dioxide whereby an alkyl hydrogen sulphate is produced and reacting said alkyl hydrogen sulphate with a basic substance selected from the group consisting of metal oxides, metal hydroxides, metal carbonates, ammonia and organic bases, to form a salt of said alkyl hydrogen sulphate.

2. A process as specified in claim 1 in which the alkyl hydroperoxide has 10–20 carbon atoms per molecule.

3. A process as specified in claim 1 in which an alkyl hydroperoxide is employed having a straight carbon chain of 12 to 16 carbon atoms.

4. A process as specified in claim 1 in which sulphur dioxide is reacted in the gaseous phase.

5. A process as specified in claim 1 in which the sulphur dioxide is reacted at a temperature in the range −10° C. to 60° C.

6. A process as specified in claim 1 in which the sulphur dioxide is reacted at a temperature within the range 0° C. to 30° C.

7. A process as specified in claim 1 in which gaseous sulphur dioxide is contacted with an agitated mixture of the alkyl hydroperoxide and an organic solvent which is inert to sulphur dioxide.

8. A process as specified in claim 1 in which gaseous sulphur dioxide is contacted with an agitated mixture of the hydroperoxide and an organic solvent selected from the group consisting of saturated hydrocarbons, alcohols and glycols.

9. A process as specified in claim 1 in which gaseous sulphur dioxide is contacted with an agitated dispersion of the alkyl hydroperoxide in an aqueous medium.

10. A process as specified in claim 1 in which liquid sulphur dioxide is contacted with the alkyl hydroperoxide.

11. A process for the production of a surface active agent which comprises reacting an alkyl substituted naphthene hydroperoxide with sulphur dioxide whereby an alkyl-naphthene hydrogen sulphate is produced and reacting the alkyl-naphthene hydrogen sulphate with a basic substance selected from the group consisting of metal oxides, metal hydroxides, metal carbonates, ammonia and organic bases to form a salt of said alkyl-naphthene, hydrogen sulphate.

12. A process as specified in claim 11 in which the alkyl substituted naphthene hydroperoxide has 10–20 carbon atoms per molecule.

13. A process as specified in claim 11 in which an alkyl naphthene hydroperoxide is employed having a straight carbon chain of 12 to 16 carbon atoms.

14. A process as specified in claim 11 in which sulphur dioxide is reacted in the gaseous phase.

15. A process as specified in claim 11 in which the sulphur dioxide is reacted at a temperature in the range −10° C. to 60° C.

16. A process as specified in claim 11 in which the sulphur dioxide is reacted at a temperature within the range 0° C. to 30° C.

17. A process as specified in claim 11 in which gaseous sulphur dioxide is contacted with an agitated mixture of the alkyl-naphthene hydroperoxide and an organic solvent which is inert to sulphur dioxide.

18. A process as specified in claim 11 in which gaseous sulphur dioxide is contacted with an agitated mixture of the alkyl-naphthene hydroperoxide and an organic solvent selected from the group consisting of saturated hydrocarbons, alcohols and glycols.

19. A process as specified in claim 11 in which gaseous sulphur dioxide is contacted with an agitated dispersion of the alkyl-naphthene hydroperoxide in an aqueous medium.

20. A process as specified in claim 11 in which liquid sulphur dioxide is contacted with the alkyl-naphthene hydroperoxide.

21. A process for the production of a surface active agent from paraffin which comprises treating a long chain paraffin with a gas consisting at least in part of molecular oxygen whereby an alkyl hydroperoxide is formed and thereafter treating at least part of the product, containing the alkyl hydroperoxide, with sulphur dioxide to form an alkyl hydrogen sulphate and reacting the alkyl hydrogen sulphate with a basic compound selected from the group comprising metal oxides, metal hydroxides, metal carbonates, ammonia and organic bases to form a salt of the alkyl hydrogen sulphates.

22. A process as specified in claim 21 in which the paraffin has 10–20 carbon atoms per molecule.

23. A process as specified in claim 21 in which the total proportion of paraffin oxidised by molecular oxygen is less than 25% by weight of the paraffin in the feedstock.

24. A process as specified in claim 23 in which the proportion of paraffin oxidised is 5–20% by weight.

25. A process as specified in claim 21 in which the paraffin oxidate is subjected to treatment for the concentration of hydroperoxide before sulphur dioxide treatment.

26. A process as specified in claim 21 in which the paraffin oxidate is extracted with a polar solvent, the extract distilled for the recovery of a hydroperoxide concentrate and the concentrate reacted with sulphur dioxide.

27. A process as specified in claim 21 in which the paraffin oxidate is treated with alkali metal base to a pH value of about 9, an aqueous layer separated, and the nonaqueous layer treated with sulphur dioxide.

28. A process as specified in claim 21 in which unoxidised hydrocarbons, recovered in the concentration of the hydroperoxide, are recycled to the oxidation stage.

29. A process for the production of a surface active agent from a naphthene which comprises treating an alkyl naphthene with a gas consisting at least in part of molecular oxygen whereby an alkyl-naphthene hydroperoxide is formed and thereafter treating at least part of the product containing the said hydroperoxide, with sulphur dioxide to form an alkyl-naphthene hydrogen sulphate and reacting the alkyl-naphthene hydrogen sulphates with a basic compound selected from metal oxides, metal hydroxides, metal carbonate, ammonia and organic bases to form a salt of the alkyl-naphthene hydrogen sulphate.

30. A process as specified in claim 29 in which the naphthene has 10–20 carbon atoms per molecule.

31. A process as specified in claim 28 in which the total proportion of naphthene oxidised by molecular oxygen is less than 25% by weight of naphthenes in the feedstock.

32. A process according to claim 29 in which the proportion of naphthene oxidised is 5–20% by weight.

33. A process for the production of surface active agents from mixtures of paraffins and naphthenes which comprises treating a mixture of long chain paraffins and alkyl substituted naphthenes with a gas consisting at least in part of molecular oxygen whereby alkyl hydroperoxides and alkyl naphthene hydroperoxides are formed and thereafter treating at least part of the product, containing the alkyl hydroperoxides and alkyl naphthene hydroperoxides with sulphur dioxide to form alkyl hydrogen sulphates and alkyl-naphthene hydrogen sulphates and reacting the alkyl hydrogen sulphates and alkyl-naphthene hydrogen sulphates with a basic compound selected from the group comprising metal oxides, metal hydroxides, metal carbonates, ammonia and organic bases to form salts of the alkyl hydrogen sulphates and alkyl-naphthene hydrogen sulphates.

34. A process as specified in claim 33 in which the total proportion of paraffin and naphthene oxidised by molecular oxygen is less than 25% of the combined weight of the paraffin and naphthene in the feedstock.

35. A process as specified in claim 34 in which the total proportion of paraffin and naphthene oxidised is 5–20% by weight.

36. A process as specified in claim 33 in which the feedstock to the treatment with molecular oxygen is a distillation fraction of petroleum.

37. A process according to claim 33 in which the feedstock to the oxidation treatment is a distillation fraction of petroleum which has been subjected to acid treatment, distillation or solvent extraction for the removal of compounds selected from the group consisting of sulphur compounds, aromatic compounds and mixtures of sulphur compounds and aromatic compounds.

38. A process as specified in claim 33 in which the hydrocarbons recovered after the sulphur dioxide treatment are recycled to the oxidation stage.

39. A process for the production of surface active agents which comprises contacting a compound selected from the group consisting of long chain alkyl hydroperoxides alkyl substituted naphthene hydroperoxides with an alkyl-metal hydroxide in a medium selected from a group consisting of an aqueous medium and an alcoholic medium with sulphur dioxide to form an alkali metal alkyl sulphate.

40. A process for the production of a surface active agent which comprises reacting an hydroperoxide selected from the group consisting of long chain alkyl hydroperoxides, alkyl naphthene hydroperoxides and mixtures thereof with sulphur dioxide to produce a sulphate selected from the group of alkyl hydrogen sulphates, alkyl naphthene hydrogen sulphates and mixtures thereof, and reacting said sulphate produced with a basic substance selected from the group consisting of metal oxides, metal hydroxides, metal carbonates, ammonia and organic bases to form a salt of said sulphate.

WILFRED JOHN OLDHAM.
MAX MARIN WIRTH.

References Cited in the file of this patent

Savmova et al.: Ivanov Doklady Akad. Nauk. S. S. S. R., vol. 59, pages 703–706 (1948), as abstracted in Chem. Abstr., vol. 42, column 6739 (1948).